April 16, 1957
C. C. SLEIGHT
2,788,604
FISHING PLUG
Filed Aug. 5, 1955
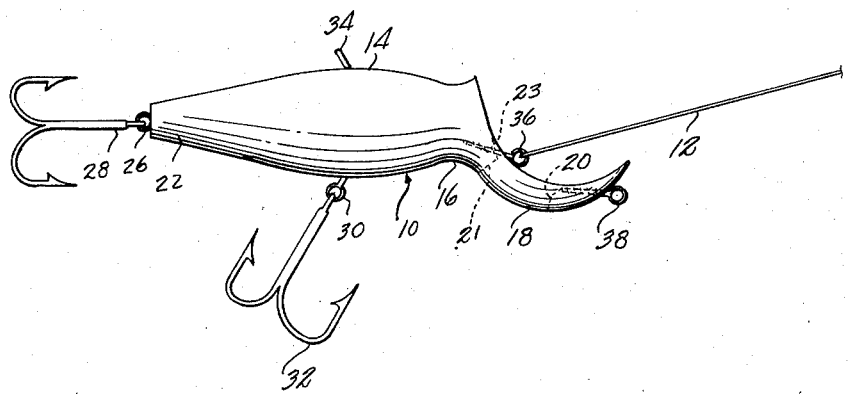
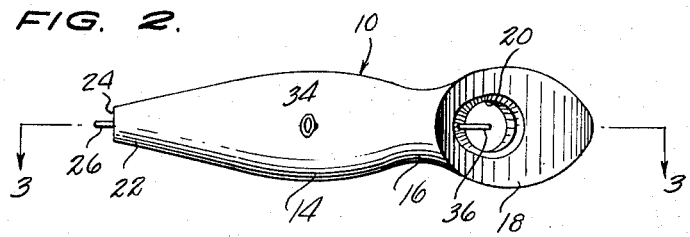
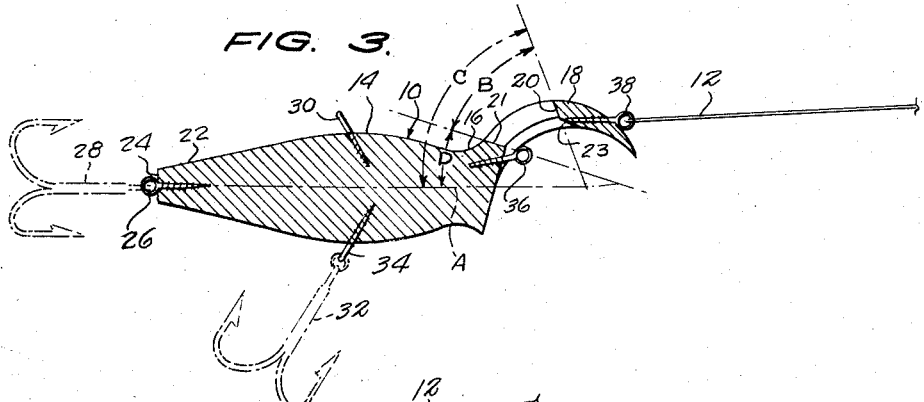
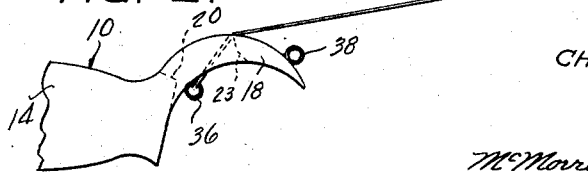
INVENTOR.
CHESTER C. SLEIGHT,
BY
McMorrow, Berman + Davidson
ATTORNEYS.

2,788,604

FISHING PLUG

Chester C. Sleight, Lansing, Mich.

Application August 5, 1955, Serial No. 526,700

1 Claim. (Cl. 43—42.06)

This invention relates to artificial fishing plugs or lures, and more particularly has reference to a lure adapted to be used either as a deep running or surface lure, and so shaped as, when used in either of these ways, to have a highly distinctive and interesting action, adapted to attract game fish in the area.

Among important objects of the invention are to provide a lure as stated which will be designed to be turned side for side, the lure when turned to one position operating as a deep running lure, and operating as a surface lure when it is in its other position.

Another object of importance is to form the lure in such a manner as to permit it to operate as a deep running or surface lure merely by connection of a leader or line to different attaching eyes provided on the front end of the lure, the location of said eyes being such, in relation to the particular front end shape of the lure, as to cause the lure to assume the deep running or surface riding characteristics mentioned.

Another object is to provide, at the front end of the lure, a lip or bib having a particular shape designed, when the lure is turned to its deep running position, to cause the lure to travel at a substantial distance below the surface, with said lip being, at the same time, designed to insure that the lure will skip or leap along the surface when the lure is turned 180° to its other position for operation as a surface lure.

Another object is to provide, in said lip, one or more apertures so shaped and located relative to the particular lip formation as to coact with the shape of the lip in achieving a distinctive action of the lure, whether the same is riding at a substantial depth or upon the surface of the water.

Other objects will appear from the following description, the claim appended thereto, and from the annexed drawings in which like reference characters designate like parts throughout the several views and wherein:

Figure 1 is a side elevational view of the lure, operating as a deep running lure;

Figure 2 is a top plan view of the lure as it appears in Figure 1;

Figure 3 is a longitudinal sectional view on line 3—3 of Figure 2; and

Figure 4 is a fragmentary side elevational view showing the lure as it appears when in use as a surface lure.

The lure constituting the present invention includes an elongated body 10 which can be externally marked or colored in any manner desired, and which can be formed of any suitable material, such as wood, plastic, or the like.

The body 10 has, substantially medially between its ends, a thickened intermediate portion 14, said intermediate portion 14 tapering toward the opposite ends of the body and, at the front end of the body, merging into a neck portion 16 slightly reduced in diameter relative to the largest diameter of the intermediate portion 14. The neck portion 16 in turn merges into a lip 18, the particular shape of which is such as to permit the lure to be used either as a deep running or surface lure. By the term "surface lure" is meant a lure that operates either upon the surface of the water itself, or, alternatively, just below the surface.

The lip 18 has outwardly curved side edges, the crest points of said side edges, that is, the portions of the side edges at which they are spaced the greatest distance apart from one another, being disposed a greater distance apart than the diameter of the widest part of the intermediate portion 14 (see Fig. 2). The lip tapers toward its forward extremity, and when viewed in side elevation, is arcuately curved through slightly less than 180° of a circle, to provide a concave inner face on the lip and a convex outer face. Said faces converge toward the forward extremity of the lip, with the lip terminating at said forward extremity thereof in a blade-like formation as shown to particular advantage in Figures 1 and 3. The concave face of the lip extends fully across the thickness of the neck 16, with the rear portion of said concave face of the lip being disposed at a slight angle from a plane normal to the longitudinal center line of the body 10.

Formed in the lip, intermediate opposite ends thereof, is a through opening 20, and the particular shape and size of this opening is such as to cause the walls of the opening to cooperate with the particular configuration of the lip in obtaining a highly distinctive action of the lure, whether the lure is operating at a substantial depth or, alternatively, as a surface lure. The illustrated opening is centrally disposed between the opposite sides of the lip as shown in Figure 2, and is of circular cross section. The end of the opening that opens upon the convex face of the lip is larger in diameter than the diameter of the intermediate portion of the opening, and the forward wall of the opening, at said end thereof, is disposed at an acute angle both to the longitudinal center line of the body and also to the rear wall of the opening. The term "rear wall" as used here and also in the appended claim, refers to the portion of the opening at said end thereof. The rear wall is also at an acute angle to the longitudinal center line of the body, but the angle defined between the rear wall 21 of the opening and said longitudinal center line of the body is substantially smaller than the angle defined between the front wall of the opening and said longitudinal center line. This is best noted from Figure 3, wherein the longitudinal center line of the lure body has been designated at A, the acute angle defined between the forward and rear walls of the opening 20 has been designated at B, the acute angle defined between the forward edge of the opening and the longitudinal center line at C, and the acute angle defined between the rear wall of the opening and the longitudinal center line at D.

As shown in Figure 3, the other end of the opening, that opens upon the concave surface of the lip, is flared, as at 23 similarly to the first named end of the opening.

Due to this particular formation of the opening relative to the lip 18 and relative to the longitudinal center line of the lure body, the pressure or force of the water resistance as the lure is drawn through the water, exerted against the lip, will be somewhat relieved, as a result of which the lure has been found to have a distinctive action bearing a close similarity to the actual movements of a bait fish.

The body is tapered as at 22, at its trailing end, being formed at its rear extremity with a flat end wall 24 lying in a plane normal to the center line A of the device. Threaded into the center of the end wall 24 is an eye 26, to which is attachable a hook 28.

A second eye 30 is threaded into the portion 14 of the body at the thickest part of said portion, said second eye being angled rearwardly as shown in Figure 3. A third eye is threaded into the thickest part of the body portion 14 at a location diametrically opposite to the eye 30, and is also angled rearwardly. A forward hook 32 is connectable to either the eye 30 or to the eye 34, depending on whether the lure is being used as a deep running or as a surface lure, and in either instance, depends from the underside of the lure body. The connection of the hook to the seleected eye 30 or 34 should be one that will permit ready attachment or detachment of the hook, and thus, the eyes 30 and 34 can be of the split type. Alternatively, the eye of the hook itself may be of the split ring type, or as a third possibility, there can be interposed between the eye of the hook and the eye 30 and 34 as the case may be, a connecting eye which would be in the form of a split ring, and would be connected to the eyes both of the hook and of the lure.

For attaching the lure to a leader or line 12, there is provided at the front end thereof eyes 36, 38. Eye 36 is secured to the concave face of the lip 18 intermediate the opposite ends of the lip, immediately adjacent the trailing wall 21 of opening 20, while eye 38 is secured to the convex face of the lip adjacent the forward extremity of the lip.

Assuming that the lure is to be used as a deep running plug, the hook 32 would be attached to the eye 30, and the leader would be attached to the eye 36. The concave face of this lip is thus faced upwardly, and when the lure is pulled through the water, the greatest force of the water will be directed against said concave face, tending to push the lure downwardly within the water so that the lure runs at a substantial depth. Part of the water pressure against the concave face of the lure is relieved by the opening 20, and the particular shape of the opening previously described herein produces a darting action which bears a close similarity to a deep running bait fish.

To use the plug as surface lure, hook 32 is secured to the eye 34, and the lure is turned 180° from its Figure 1 position, about an axis defined by the longitudinal center line A thereof. The concave face of the lip will now be faced downwardly, with the lip projecting above the top surface of the body as shown in Figure 4. The leader in this instance is threaded through the opening, and is attached to eye 36. Now, when the lure is pulled through the water, the greatest resistance will be again imposed upon the concave face of the lure, tending to push the lure upwardly, while at the same time, a counterforce is exerted by the line 12 bearing against the front wall of the opening, so that the lure has a somewhat irregular action, causing it to rise to the surface and then move slightly below the surface and, at intervals, to leap above the surface. Again, the shape of the opening is such as to produce an interesting, distinctive, slightly erratic action within the water, simulating the movements of a surface running bait fish quite closely.

It will be understood that although a single opening 20 is shown, the opening can be at different locations upon the lip, and also, instead of a single opening, there can be used a series of smaller apertures located within the area of said lip. Still further, the eyes 36, 38 can be attached at locations other than those shown, and further, can be used in different combinations with the various apertures provided in the lip, thus to produce a wide variety of movements of the lure, whether used as a deep running or as a surface lure.

Ordinarily, when the lure is used, the single eye 36 will be sufficient for attachment of the leader, whether the lure is to run at a substantial depth or upon the surface, but in either instance, the eye 38 can be used, to produce a slightly different action deriving from the fact that the pull of the line upon the lure will be at a different location upon the bib or lip.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles it being considered that the invention comprehends any minor change in construction that may be permitted within the scope of the appended claim.

What is claimed is:

A fishing plug comprising an elongated body of streamlined, symmetrical contour; hook means connected to said body; a lip rigid with the forward end portion of the body and disposed wholly to one side of the longitudinal median of the body, said lip projecting forwardly from the body and being longitudinally curved through slightly less than 180 degrees forming a concave inner and a convex outer surface on the lip, the lip being progressively decreased in thickness in a direction toward its front end to define a blade-like forward extremity thereon, said body having a front end surface lying as a smooth continuation of the concave surface, substantially in a plane inclined slightly in respect to a plane normal to the length of the body, said lip having a large opening therethrough extending from the base of the lip for substantially half the distance from the base to the forward extremity of the lip, the wall of said opening having portions flaring from a location intermediate the thickness of the lip in opposite directions to the convex and concave surfaces of the lip, the portion flaring toward the convex surface of the lip having a rear part lying at an acute angle to the longitudinal median of the body and a front part also lying at an acute angle to said longitudinal median, the first angle being smaller than the second angle, said front and rear parts being at acute angles to each other; and a pair of line-attaching eyes on the lip, one projecting from the concave surface substantially at the juncture of the lip with the front end surface of the body, and the other projecting from the convex surface in closely spaced relation to the forward extremity of the body.

References Cited in the file of this patent
UNITED STATES PATENTS

| | | |
|---|---|---|
| 1,609,855 | Bayer | Dec. 7, 1926 |
| 2,234,077 | Haley | Mar. 4, 1941 |
| 2,381,231 | Spear | Aug. 7, 1945 |
| 2,525,733 | Suick | Oct. 10, 1950 |
| 2,572,616 | Hansen | Oct. 23, 1951 |
| 2,578,786 | Davis | Dec. 18, 1951 |
| 2,618,096 | Wagner | Nov. 18, 1952 |
| 2,659,176 | Wenger | Nov. 17, 1953 |